(12) United States Patent
Starkey et al.

(10) Patent No.: US 6,307,467 B1
(45) Date of Patent: Oct. 23, 2001

(54) PROCESS AND APPARATUS FOR RESETTING A MICRO-MECHANICAL CONDITION SENSOR

(75) Inventors: Gene Raymond Starkey, Niwot; Richard Stephen Pollack, Boulder, both of CO (US)

(73) Assignee: The Goodyear Tire & Rubber Company, Akron, OH (US)

( * ) Notice: Subject to any disclaimer, the term of this patent is extended or adjusted under 35 U.S.C. 154(b) by 18 days.

(21) Appl. No.: 09/699,974

(22) Filed: Oct. 30, 2000

(51) Int. Cl.[7] .................................................. B60Q 1/00
(52) U.S. Cl. ...................... 340/438; 340/439; 340/572.3; 340/572.1; 340/825.54; 200/61.45 R; 200/181
(58) Field of Search ..................... 340/438, 439, 340/572.3, 572.1, 825.54; 200/61.45 R, 181

(56) References Cited

U.S. PATENT DOCUMENTS 5,712,609 1/1998 Mehregany et al. .................... 337/70
6,025,780 * 2/2000 Bowers et al. .................... 340/572.3

* cited by examiner

Primary Examiner—Jeffery Hofsass
Assistant Examiner—Tai T. Nguyen
(74) Attorney, Agent, or Firm—Howard M Cohn

(57) ABSTRACT

The invention relates to an electronic tag (60) that includes a transponder (62) and a micro-mechanical temperature memory switch (MTMS) (16a) having an unlatched state (24a) and latched state (26a) and a method of resetting the MTMS (16a). The method includes the step of providing second apparatus (68, 72) for providing a second D.C. signal (73) and an electronic switching circuit (67) for receiving the first and second D.C. signals (48a, 73). The electronic switching circuit (67) is connected for normally applying the first D.C. signal (48a) to the logic circuit (50a) and for diverting the first D.C. signal (48a) therefrom to the MTMS (16a) for resetting the MTMS (16a) in response to receiving the second D.C. signal (73).

16 Claims, 4 Drawing Sheets

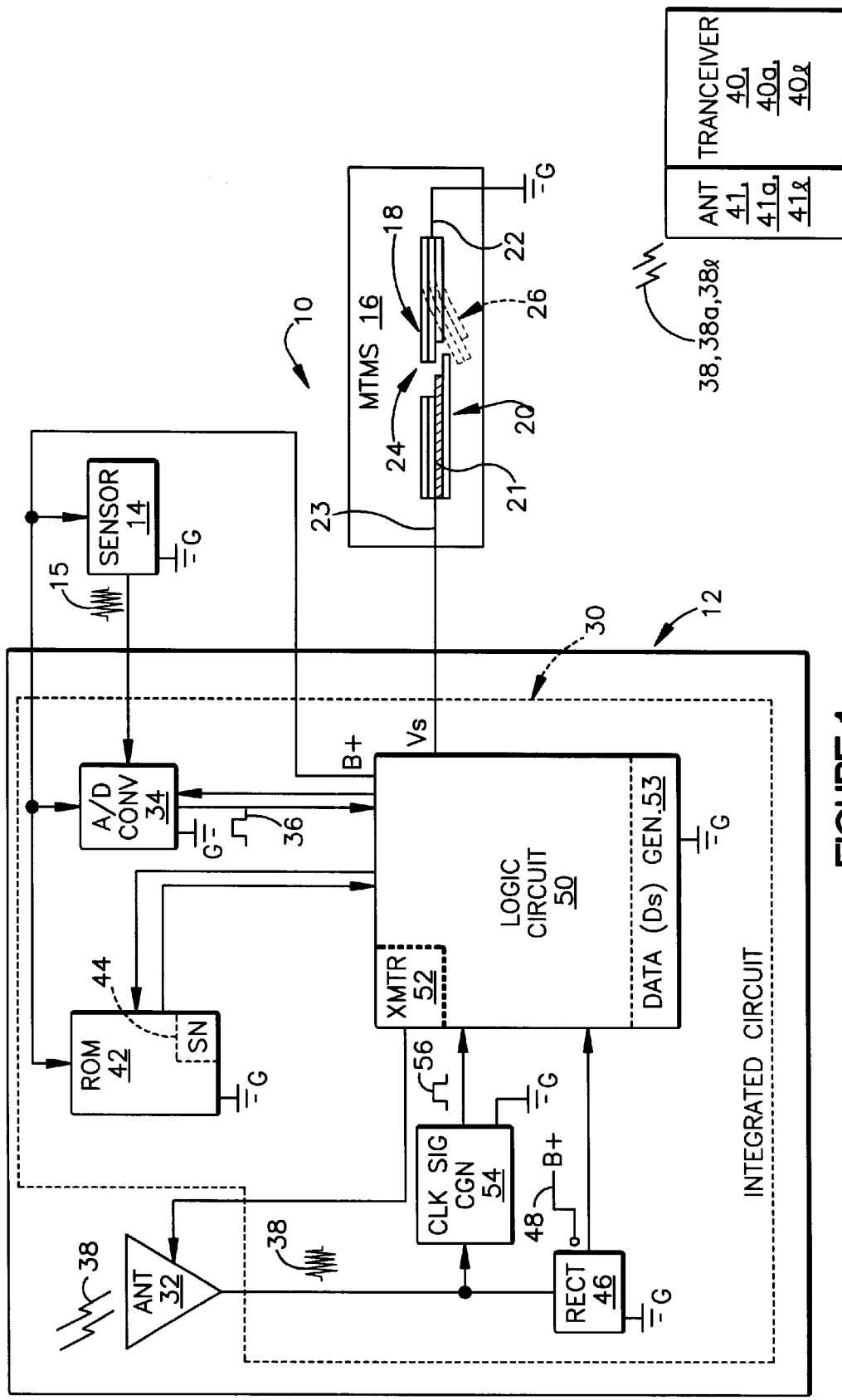

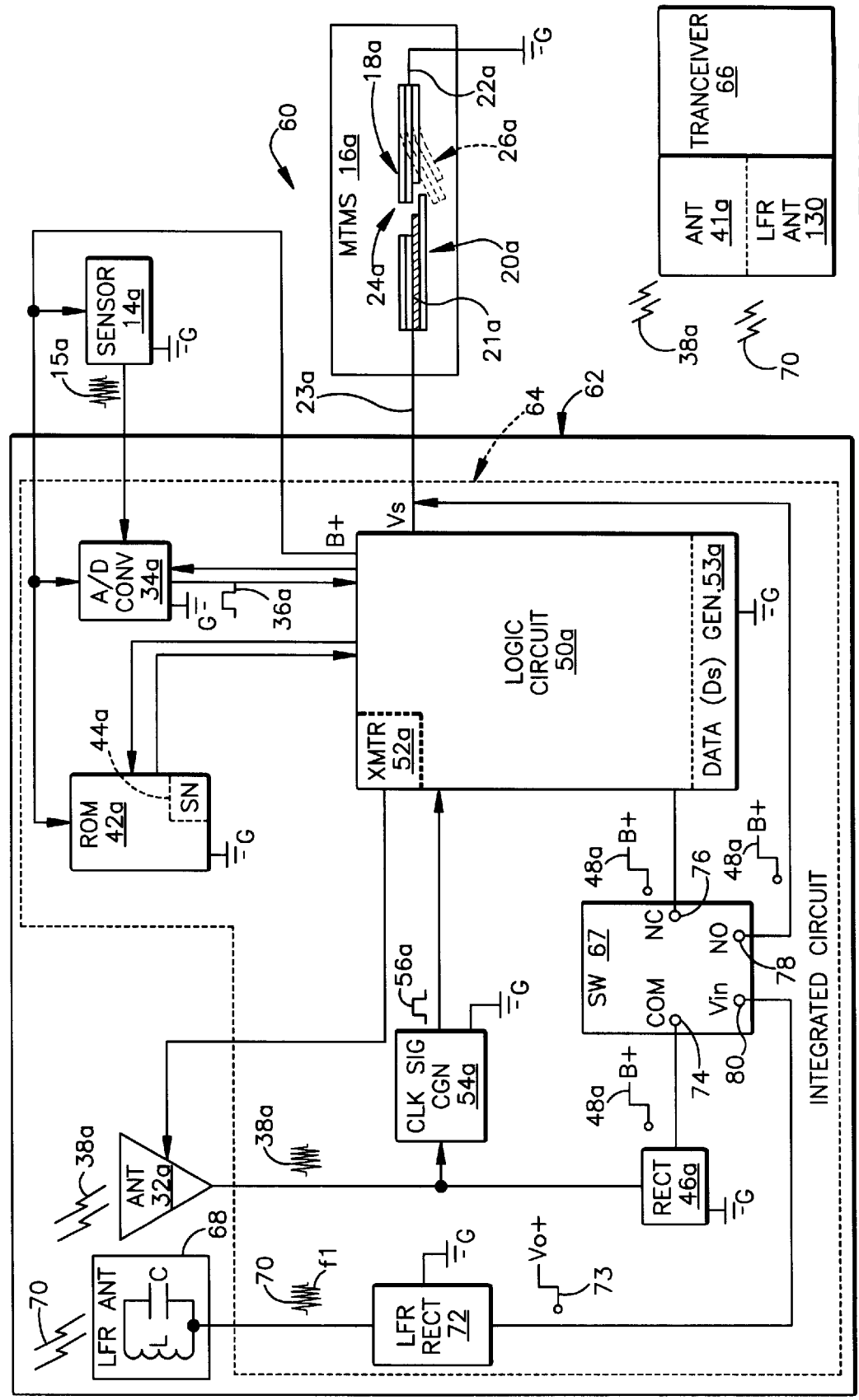

PROCESS AND APPARATUS FOR RESETTING A MICRO-MECHANICAL CONDITION SENSOR

CROSS REFERENCE TO RELATED APPLICATIONS

This application relates to U.S. Patent Application entitled PROCESS AND APPARATUS FOR RESETTING A DIRECTLY RESETTABLE MICRO-MECHANICAL TEMPERATURE MEMORY SWITCH Ser. No. 09/699,807, having a filing date concurrently herewith.

TECHNICAL FIELD

This invention relates to a process and apparatus for resetting a micro-mechanical condition sensor and more particularly with a process and apparatus for resetting a maximum temperature memory switch.

BACKGROUND OF THE INVENTION

U.S. Pat. No. 5,712,609 ('609) to Mehregany et al., incorporated in its entirety by reference herein, describes a micro-mechanical condition sensor, fabricated on a silicon or bimetallic substrate, that is constructed and arranged for sensing a threshold value. As discussed in the '609 Patent, when an extreme temperature condition occurs and is sensed by a micro-mechanical temperature sensor, the sensor latches, and remains latched to provide a memory of the event available for detection purposes. Due to such characteristics, the micro-mechanical temperature sensing circuit has come to be known in the art as a maximum temperature memory switch (MTMS). For detection purposes, test ports are provided to permit the detection of the latched or unlatched states of the MTMS. The detection circuitry applied to the test ports typically detects an electrical condition of the latch, including a resistance, capacitance, continuity or other electrical condition.

In addition, to the foregoing, it is well-known in the art to combine one or more conventional sensors for measuring various temperatures and pressure conditions, with an integrated circuit (IC) to form a multi-chip module. A typical IC generally includes a suitable complimentary, metal-oxide semiconductor (CMOS) having a read only memory (ROM) circuit and an analog to digital (A/D) converter circuit. The IC is also typically constructed and arranged for converting analog temperature and pressure signals from the sensors to digital data corresponding thereto for storage in the ROM circuit of the CMOS chip.

For recording temperature and pressure conditions within pneumatic tires, the aforesaid multi-chip module has been incorporated into an electronic tire tag. A typical electronic tag includes a suitable radio frequency RF transponder having an antenna electrically connected thereto. In addition, the transponder includes one or more temperature or pressure sensors and an integrated circuit. Further, the integrated circuit has a serial number (SN) stored in the ROM circuit thereof, for identifying the electronic tire tag. Moreover, the integrated circuit includes suitable circuitry that is responsive to energization of the RF transponder from an external RF transceiver circuit, for causing the RF transponder to transmit data corresponding to the SN, followed by data corresponding the then current temperature or pressure conditions of the pneumatic tire.

Such electronic tire tags are conventionally encapsulated in rigid or semi-rigid materials, such as urethanes, epoxies or polystyrene resins, hard rubber compounds and the like. Thereafter, the encapsulated electronic tire tags have been wrapped with a green rubber material and, either incorporated within an uncured rubber tire or within a retread tire for vulcanization therewith to form an integral part of a cured or retreaded pneumatic tire, or separately vulcanized to form a cured rubber patch that may be fixedly attached to the innerliner of a pneumatic tire.

More recently, a MTMS as discussed in the '609 Patent, has been conventionally incorporated into an electronic tire tag. The MTMS provides an indication as to whether or not a predetermined, extreme threshold temperature has been experienced by the pneumatic tire in the course of usage thereof. Typically, the predetermined temperature has been selected to evaluate whether the warranties concerning the pneumatic tire will become void because the tire experiences the predetermined, extreme temperature. In effect, achieving the predetermined temperature can be considered irrefutable evidence of abusive use of the tire, i.e. operating the tire in an overloaded or underpressurized condition. However, the elevated temperatures and pressures achieved in the course of the vulcanization of tires, retreads or patches containing a MTMS have caused the latter switches to latch, indicating that the predetermined temperature has been reached. As a result, the MTMS has to be reset before it is useful for the intended purpose of providing an indication of abusive use of the tire in the course of operation thereof.

BRIEF DESCRIPTION OF THE INVENTION

The present invention includes a method of resetting a micro-mechanical temperature memory switch (MTMS) having an unlatched state and latched state in an electronic tag with a transponder having a logic circuit and first apparatus for providing a first direct current (D.C.) signal. The method includes the steps of providing a second D.C. signal with a second apparatus; receiving the first and second D.C. signals with an electronic switching circuit; and normally applying the first D.C. signal to the logic circuit and diverting the first D.C. signal to the MTMS for resetting the MTMS in response to receiving the second D.C. signal with an electronic switching circuit.

The method also includes receiving the second D.C. signal with an electronic switching circuit to divert the first D.C. signal from energization of the logic circuit to energize the MTMS to reset from the latched state thereof to the unlatched state thereof. Also, the method includes providing the first D.C. signal apparatus with a first radio frequency (RF) antenna for receiving a first RF signal; providing the transponder with a first RF rectifier circuit electrically connected to the first RF antenna for receiving the first RF signal therefrom; and rectifying the first RF signal for providing the first D.C. signal.

The method also includes providing the second D.C. signal providing apparatus with a second radio frequency (RF) antenna for receiving a second RF signal; and providing the second D.C. signal providing apparatus with a second RF rectifier circuit electrically connected to the second RF antenna for receiving therefrom and rectifying the second RF signal for providing the second D.C. signal. Moreover, providing the second RF antenna includes the step of tuning the second RF antenna to a predetermined frequency, such as to a frequency within the range of from 13.553 to 13.567 megahertz.

Preferably, the method includes disposing the tag within a tire and the MTMS is reset to the unlatched state subsequent to the tire reaching a predetermined temperature causing the MTMS to go into the latched state.

Also according to the invention, an electronic tag includes a transponder and a micro-mechanical temperature memory switch (MTMS) having an unlatched state and a latched state. The transponder includes a logic circuit. The electronic tag includes first apparatus for providing a first direct current (D.C.) signal. The electronic tag has second apparatus for providing a second D.C. signal; an electronic switching circuit for receiving the first and second D.C. signals; and the electronic switching circuit is connected for normally applying the first D.C signal to the logic circuit and for diverting the first D.C. signal therefrom to the MTMS for resetting the MTMS in response to receiving the second D.C. signal.

Also, the electronic switching circuit is operable in response to receiving the second D.C. signal to divert the first D.C. signal from energization of the logic circuit to energization of the MTMS to reset from the latched state thereof to the unlatched state thereof. Moreover, the first D.C. signal providing apparatus includes a first radio frequency (RF) antenna for providing a first RF signal, and the transponder includes a first RF rectifier circuit electrically connected to the first RF antenna for receiving therefrom and rectifying the first RF signal for providing the first D.C. signal. Also, the second D.C. signal providing apparatus includes a second radio frequency (RF) antenna for providing a second RF signal, the transponder including a second RF rectifier circuit electrically connected to the second RF antenna for receiving therefrom and rectifying the second RF signal for providing the second D.C. signal. The second D.C. signal providing apparatus includes a second radio frequency (RF) antenna tuned to a predetermined radio frequency, such as for example, an ISM equipment frequency band, or a frequency within the range of from 13.553 to 13.567 megahertz Also according to the invention, the second D.C. signal providing apparatus includes a second RF rectifier circuit electrically connected to the second RF antenna for receiving the second RF signal and providing the second D.C. signal.

In accordance with the invention, the tag is disposed within a tire whereby the MTMS is actuated when the tire reaches a predetermined temperature.

BRIEF DESCRIPTION OF THE DRAWINGS

Selected parts of the drawings hereinafter described may be shown out of scale for the sake of illustrative clarity. Moreover, cross-sectional views, if any, that are included herein are focused on and limited to a view along the line of the cross-section and omit background structure that would otherwise be shown in a true cross-sectional view, again, for the sake of illustrative clarity.

As shown in the following drawings, wherein like reference numerals designate like or corresponding parts throughout the several Figures:

FIG. 1 is a schematic view of a prior art electronic tire tag that may be modified according to the invention;

FIG. 2 is a schematic view of a prior art transceiver;

FIG. 3 is a schematic view of a first embodiment of an electronic tag according to the invention;

FIG. 4 is a schematic view of a transceiver according to the invention;

Figure 5:
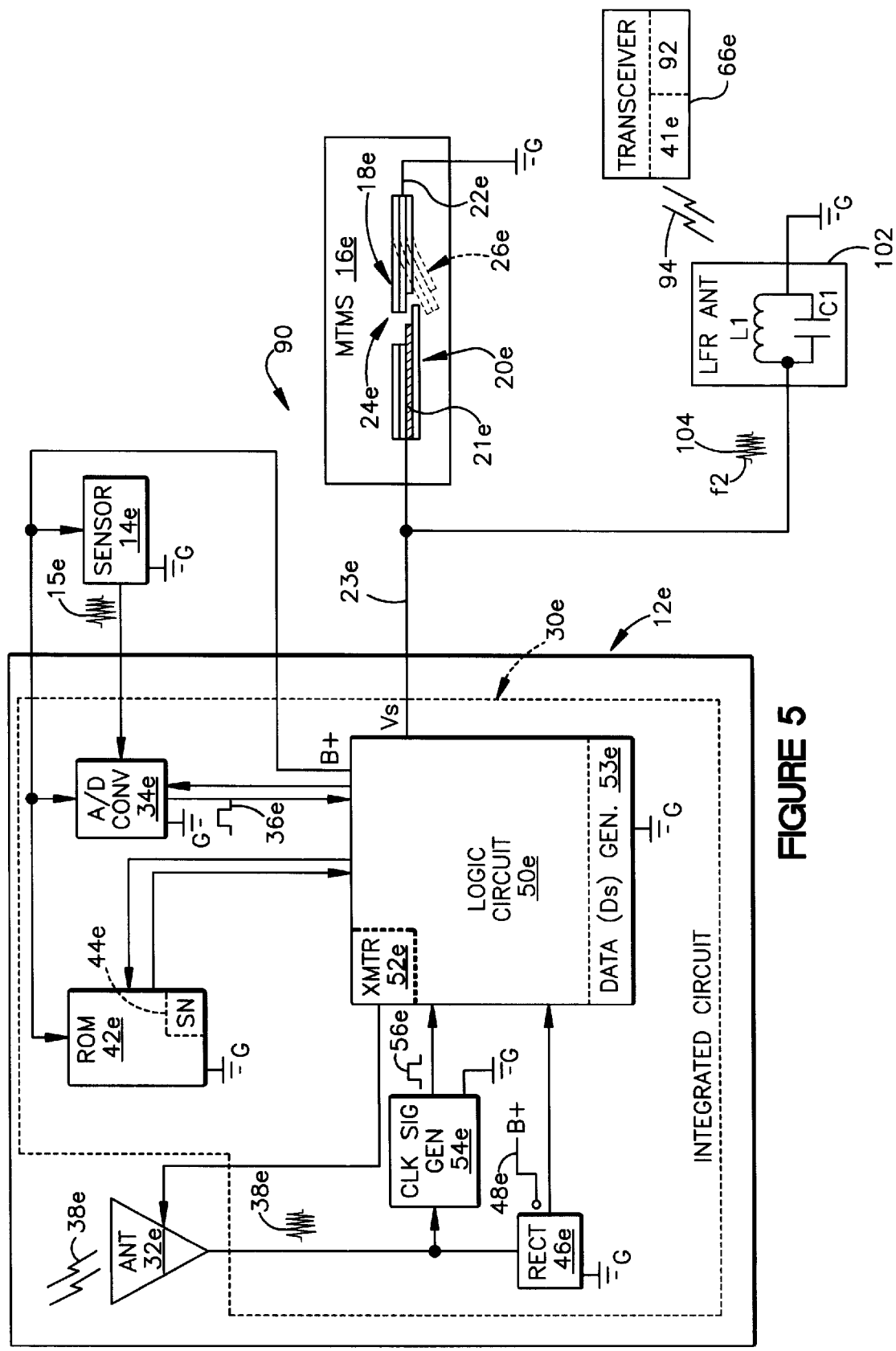
FIG. 5 is a schematic view of a second embodiment of an electronic tag according to the invention.

Other aspects, features and advantages of the invention will become apparent in light of the following description thereof.

DEFINITIONS

"Axial" or "Axially" means the lines or directions extending parallel to the axis of rotation of a tire.

"Bead" generally means of annularly shaped, member located within either of the inner radial end portions of a tire.

"Bead Portion" generally means either of the opposed radial inner end portions of the carcass of a tire including a bead, the portion of a ply which is looped about the bead, and the rubber material surrounding the bead and ply portion.

"Carcass" generally means the tire structure including the beads and ply. But excluding the belt structure, undertread over the ply and the tread.

"Equatorial Plane" means the imaginary plane extending perpendicular to the axis of rotation of the tire and passing through the center of the tread; or the plane containing the circumferential centerline of the tread.

"Ply" generally means a cord-reinforced layer of rubber-coated, radially deployed material.

"Radial" means directions extending radially toward or away from the axis of rotation of the tire.

"Sidewall" generally means a radially extending portion of a tire.

DETAILED DESCRIPTION OF THE INVENTION

A typical prior art electronic tire tag 10 (FIG. 1), that may be modified according to the invention, has an electrical ground (G) and generally comprises a suitable transponder 12 and at least one conventional temperature or pressure condition sensor 14 that is electrically connected to the transponder. The condition sensor 14 generates an analog signal 15 corresponding to a condition sampled by the condition sensor 14 in response to energization thereof.

The electronic tire tag 10 also includes at least one micro-mechanical temperature sensing circuit 16 of the type shown and described in the '609 Patent and known in the art as a maximum temperature memory switch (MTMS). The MTMS 16 can be fabricated on a silicon or bimetallic substrate and includes switching structure that normally has an unlatched state, switches to a latched state in the event of exposure to an extreme temperature and maintains the latched state to provide a memory of the event. The MTMS 16 is electrically connected to the transponder 12. The MTMS 16 has a multi-layered, bimetallic temperature-sensing beam 18 and a multi-layered, bimetallic, resetting beam 20 that includes a polysilicon heating resistance layer 21. Further, the MTMS 16 has a test lead 22 extending from the temperature sensing beam 18, and a test lead 23 extending from the resetting beam 20. The test lead 23 is electrically connected to the transponder 12, and the test lead 22 is electrically connected to the ground G. The temperature sensing beam 18 has a normally open, unlatched, state or position 24 (relative to the resetting beam 20), wherein the temperature sensing beam 18 is disposed in overlapping relationship with the resetting beam 20. In the unlatched position 24, the electrical impedance of the MTMS 16, as measured between the leads 22 and 23, is substantially five megohms. Moreover, the temperature sensing beam 18 has a deflected state or position 26 (shown in dotted lines) relative to the resetting beam 20 (the latched state), wherein the resetting beam 20 is disposed in deflecting engagement with the temperature sensing beam 18 and the electrical impedance of the MTMS 16, as measured between the leads 22 and 23, is substantially five hundred ohms. The MTMS 16 operates to close to the latched position 26, when the MTMS 16 is exposed to a predetermined temperature. Thus, the voltage Vs across the MTMS 16 is normally at a high value, corresponding to an open circuit, until the MTMS 16 is exposed to the predetermined temperature condition, whereupon, the voltage Vs falls to a low value, corresponding to a closed circuit. A more detailed description of the structure and operation of the MTMS 16 may be found in the aforesaid '609 Patent that is incorporated in its entirety by reference herein.

The transponder 12, as shown in FIG. 1, includes an integrated circuit 30 that is typically a suitable complimentary, metal-oxide semiconductor, and includes an antenna (ANT) 32 that is electrically connected to the integrated circuit 30. The integrated circuit 30 includes a conventional analog to digital (A/D) converter circuit 34 that may be a suitable relaxation oscillator circuitry. The A/D converter circuit 34 is electrically connected to the condition sensor 14 for receiving therefrom the analog signal 15 and converting the analog signal 15 to a digital signal 36 representative of the condition sampled by the condition sensor 14. The antenna 32 may be suitably tuned to a predetermined radio frequency (RF) signal 38 within the range of from 115 to 135 kilohertz, and typically 125 kilohertz, for receiving RF signals 38 from an external transceiver 40, as shown in FIG. 2, having an antenna 41. The integrated circuit 30 of FIG. 1 also includes a read only memory (ROM) 42 that is typically an electrically erasable, programmable, read only memory (EEPROM) having stored therein a unique serial number (SN) 44 for identifying the electronic tire tag 10.

Moreover, the integrated circuit 30 of FIG. 1 includes a rectifying circuit (RECT) 46 that is electrically connected to the antenna 32 for receiving the RF signal 38 therefrom, in response to the antenna 32 receiving the RF signal 38 from the external transceiver 40 of FIG. 2. The rectifying circuit 46 rectifies the RF signal 38 to provide a direct current (D.C.) power signal (B+) 48 for energizing the integrated circuit 30 and the connected condition sensor 14. The integrated circuit 30 is thus constructed and arranged for receiving a RF signal 38 and applying the received RF signal 38 to the rectifying circuit 46 for rectification thereby to provide the D.C. power signal 48. Moreover, the integrated circuit 30 includes a logic circuit 50 having a transmitter circuit (XMTR) 52 and data generating structure 53. In addition, the integrated circuit 30 includes a clock signal generating (CLK SIG GEN) circuit 54, such as a conventional rectifying or counting circuit. The clock signal generating circuit 54 is conventionally constructed and arranged to receive the RF signal 38, derive therefrom or otherwise generate a high frequency digital clock signal 56 and apply the clock signal 56 to the logic circuit 50 for use by the latter as a timing signal.

The logic circuit 50 of FIG. 1 is conventionally connected to the rectifier circuit 46 for receiving the D.C. power signal 48 therefrom. The logic circuit 50 is also electrically connected between the antenna 32, the read only memory 42, and the A/D converter circuit 34. In addition, the logic circuit 50 is constructed and arranged to respond to receiving the D.C. power signal 48 from the rectifier circuit 46 to energize the condition sensor circuit 14, the MTMS 16, the A/D converter circuit 34 and ROM circuit 42. Moreover, the logic circuit 50 is constructed and arranged to direct the serial number 44 from the energized ROM circuit 42 to the logic circuit 50. Still further, the logic circuit 50 is constructed and arranged to cause the energized A/D converter circuit 34 to convert the analog condition signal 15 to a digital condition signal 36 and provide the digital signal 36 to the logic circuit 50. Still further, the logic circuit 50 is constructed and arranged to determine the unlatched or latched state, 24 or 26, of the MTMS 16, and to cause the data generating structure 53 to generate data Ds corresponding thereto, when the logic circuit 50 is energized. Moreover, the logic circuit 50 is constructed and arranged to cause the transmitter circuit 52 to transmit to the external transceiver, shown in FIG. 2, the data corresponding to the serial number 44, the digital condition signal 36 and the data Ds corresponding to the unlatched or latched state, (24 or 26, respectively) of the MTMS 16, when the logic circuit 50 is energized.

Although the following discussion is concerned with an electronic "tire" tag, it is more generally applicable to an electronic tag that is usable in applications for making measurements of physical conditions of structures including but not limited to pneumatic tires. Accordingly, the following discussion is generally applicable to electronic tags and specifically to electronic tire tags.

First Embodiment

According to a first embodiment of the invention, an electronic tire tag 60, as shown in FIG. 3, includes numerous components corresponding in all respects to those of the prior art electronic tire tag 10 of FIG. 1. In the following discussion, such corresponding components of FIG. 3 each bear the same numerical designations as in FIG. 1, followed by the letter "a."

The electronic tire tag 60 of FIG. 3 has an electrical ground (G), and generally comprises a suitable transponder 62 and, optionally includes at least one conventional temperature or pressure condition sensor 14a that is suitably electrically connected to the transponder 62. Assuming the provision thereof, the at least one condition sensor 14a provides an analog signal 15a corresponding to a condition sampled by the condition sensor 14a in response to energization thereof.

The electronic tire tag 60 (FIG. 3) preferably includes a maximum temperature memory switch (MTMS) 16a that is conventionally electrically connected to the transponder 62. The MTMS 16a has a multi-layered, bimetallic temperature-sensing beam 18a. In addition, the MTMS 16a has a multi-layered, bimetallic, resetting beam 20a that includes a polysilicon heating resistance layer 21a. Further, the MTMS 16a has a test lead 22a extending from the temperature sensing beam 18a, and has a test lead 23a extending from the resetting beam 20a. The test lead 23a is conventionally electrically connected to the transponder 62 and the test lead 22a is conventionally electrically connected to the ground G. The temperature sensing beam 18a has a normally open, unlatched, state or position 24a, relative to the resetting beam 20a, wherein the temperature sensing beam 18a is disposed in overlapping relationship with the resetting beam 20a. In the unlatched position 24a, the electrical impedance of the MTMS 16a, as measured between the leads 22a and 23a, is preset to a value, such as for example substantially five megohms. Moreover, the temperature sensing beam 18a has a deflected or latched state or position 26a, relative to the resetting beam 20a, wherein the resetting beam 20a is disposed in deflecting engagement with the temperature sensing beam 18a and the electrical impedance of the MTMS 16a, as measured between the leads, 22a and 23a, is preset to a value, such as for example substantially five hundred ohms. The MTMS 16a operates to close to the latched position 26a, when the MTMS 16a is exposed to a predetermined temperature. Thus, the voltage Vs across the MTMS 16a is normally at a high value, corresponding to an open circuit, until the MTMS 16a is exposed to the predetermined temperature condition, whereupon, the voltage Vs falls to a low value, corresponding to a closed circuit. A more detailed description of the structure and operation of the MTMS 16a may be found in the aforesaid '609 Patent.

The transponder 62 of FIG. 3 includes an integrated circuit 64 that is typically a suitable complimentary, metal-oxide semiconductor, and includes an antenna (ANT) 32a that is conventionally electrically connected to the integrated circuit 64. Assuming the provision of the at least one condition sensor 14a, the integrated circuit 64 includes a conventional analog to digital (A/D) converter circuit 34a that may be suitable relaxation oscillator circuitry. And, assuming the provision thereof, the A/D converter circuit 34a is conventionally electrically connected to the condition sensor 14a for receiving therefrom the analog signal 15a and converting the analog signal 15a to a digital signal 36a representative of the condition sampled by the condition sensor 14a. The antenna 32a can be suitably tuned to a predetermined radio frequency (RF) signal 38a within the range of from 115 to 135 kilohertz, and typically 125 kilohertz, for receiving RF signals 38a from an external transceiver (see FIG. 4) having an antenna 41a. The integrated circuit 64 of FIG. 3 also includes a read only memory (ROM) 42a that is typically an electrically erasable, programmable, read only memory (EEPROM) having stored therein a unique serial number (SN) 44a for identifying the electronic tire tag 60.

Moreover, the integrated circuit 64 (FIG. 3) includes an RF rectifier circuit (RF RECT) 46a that is suitably electrically connected to the antenna 32a for receiving the RF signal 38a therefrom, in response to the antenna 32a receiving the RF signal 38a from an external transceiver 66 (FIG. 4). The RF rectifier circuit 46a rectifies the RF signal 38a to provide a direct current (D.C.) power signal (B+) 48a, for energizing the integrated circuit 64 and, if provided, the connected condition sensor 14a. The integrated circuit 64 is thus constructed and arranged for receiving a RF signal 38a and applying the received RF signal 38a to the RF rectifier circuit 46a for rectification thereby to provide the D.C. power signal 48a. Moreover, the integrated circuit 64 includes a logic circuit 50a having a transmitter circuit (XMTR) 52a and data generating structure 53a. Still further, the integrated circuit 64 includes a normally closed electronic switching circuit (SW) 67 that is interposed between and is conventionally electrically connected to the RF rectifying circuit 46a and the logic circuit 50a. The integrated circuit 64 includes a suitable clock signal generating (CLK SIG GEN) circuit 54a, such as a conventional rectifying or counting circuit. The clock signal generating circuit 54a is conventionally constructed and arranged to receive the RF signal 38a, derive therefrom or otherwise generate a high frequency digital clock signal 56a and apply the clock signal 56a to the logic circuit 50a for use thereby as a timing signal.

The logic circuit 50a (FIG. 3) is normally conventionally electrically connected to the RF rectifier circuit 46a, via the normally closed switching circuit 67 for receiving the D.C. power signal 48a from the RF rectifier circuit 46a. The logic circuit 50a is also conventionally electrically connected between the antenna 32a and the read only memory 42a, and, assuming the provision of the A/D converter circuit 34a, between the antenna 32a and the A/D converter circuit 34a. In addition, the logic circuit 50a is constructed and arranged to respond to receiving the D.C. power signal 48a from the RF rectifier circuit 46a to energize the ROM circuit 42a and the MTMS 16a, and, if provided, the at least one condition sensor 14a and the A/D converter circuit 34a. Moreover, the logic circuit 50a is constructed and arranged to copy the serial number 44a from the energized ROM circuit 42a to the logic circuit 50a. Still further, assuming the provision of the A/D converter circuit 34a, the logic circuit 50a is constructed and arranged to cause the energized A/D converter circuit 34a to convert the analog condition signal 15a to a digital condition signal 36a and provide the digital signal 36a to the logic circuit 50a. Still further, the logic circuit 50a is constructed and arranged to determine the unlatched or latched state, 24a or 26a, of the MTMS 16a, and to cause the data generating structure 53a to generate data Ds corresponding thereto, when the logic circuit 50a is energized. Moreover, the logic circuit 50a is constructed and arranged to cause the transmitter circuit 52a to transmit to the external transceiver 66 the data corresponding to the serial number 44a and data Ds corresponding to the unlatched or latched state, 24a or 26a, of the MTMS 16a, when the logic circuit 36a is energized. In addition, assuming the provision of the at least one condition sensor 14a and the A/D converter circuit 34a, the logic circuit 50a is constructed and arranged to transmit data corresponding to the digital condition signal 36a when the logic circuit 50a is energized.

The electronic tire tag 60 (FIG. 3) additionally includes a conventional low frequency radio (LFR) antenna (ANT) 68 that is preferably constructed and arranged for receiving a predetermined LFR signal 70. The LFR antenna 68 is preferably tuned to a frequency (f1) within one of the frequency bands allocated for industrial, scientific and medical (ISM) equipment, as set forth in the U.S. Code of Federal Regulations (CFR) Title 47 Telecommunications, Chapter I Federal Communication Commission (FCC), Part 18-Industrial, scientific, and medical equipment, Subpart C—Technical Standards, Section 18.301 Operating Frequencies. The LFR antenna 68 is therefore a suitable coil (L) that is conventionally tuned to receiving a frequency f1 within an ISM equipment frequency band, as by means of suitable capacitor "C." The capacitor C is conventionally electrically to the coil L, preferably, there across. Preferably the tuned frequency f1 is nominally 13.56 MHz, or, within the range of from 13.553 to 13.567 MHz. However, without departing from the scope of the invention, the LFR antenna 68 may be tuned to a frequency f1 within the range of the frequencies of any other ISM equipment frequency band.

The electronic tire tag 60 (FIG. 3) additionally includes a conventional low radio frequency rectifier circuit (LFR RECT) 72. The low frequency rectifier circuit 72 is suitably electrically connected to the LFR antenna 68 for receiving the LFR signal 70 therefrom in response to the LFR antenna 68 receiving the LFR signal 70 from the external transceiver 66 (FIG. 4). The LFR rectifying circuit (FIG. 3) rectifies the LFR signal 68 to provide a direct current (D.C.) power output signal (Vo+) 73.

The electronic switching circuit 67 (FIG. 3), is preferably a CMOS switch (SW) including a common terminal (COM) 74, a normally closed terminal (NC) 76 and a normally open terminal (NO) 78. In addition, the electronic switching circuit 67 includes an operating voltage input terminal (Vin)

80. The common terminal 74 is conventionally electrically connected to the RF rectifier circuit 46a for receiving the D.C power input signal 48a therefrom. The normally closed terminal 76 is conventionally electrically connected to the logic circuit 50a for providing the D.C. power input signal 48a thereto. The operating voltage input terminal 80 is conventionally electrically connected to the LFR rectifier circuit 72 for receiving the D.C. power output signal 73 therefrom. And, the normally open terminal 78 is conventionally electrically connected to the test lead 23a of the MTMS 16a.

The electronic switching circuit 67 (FIG. 3) has an internal structure that is analogous to a single-pole, double-throw, type of switch. The electronic switching circuit 67 normally maintains an internal electrical connection between the common and normally closed terminals, 74 and 76. Thus the D.C. power signal 48a is normally applied to the logic circuit 50a via the electronic switching circuit 67 for energization thereof. On the other hand, when the LFR antenna 68 receives a low RF signal 70 from the external transceiver 66 (FIG. 4), the LFR signal 70 (FIG. 3) is rectified by the LFR rectifier circuit 72, and the resultant D.C. power output voltage signal 73 is applied to the input voltage terminal 80 of the electronic switching circuit 67. As a result, the electronic switching circuit 67 operates to internally electrically disconnect from one another the common and normally closed terminals, 74 and 76, and to internally interconnect to one another the common and normally open terminals, 74 and 78, for diverting the D.C. power input signal 48a from energization of the logic circuit 50a to energization of the MTMS 16a and thus to energization of the resetting beam resistance 21a. As a result, the latched temperature sensing beam 18a, is further deflected by the resetting beam 20a, against the resilient energy developed therein, until the resetting beam 20a is moved out of contact with the temperature sensing beam 18a. Whereupon, the resilient energy stored in the temperature sensing beam 18a returns the temperature sensing beam 18a to the unlatched position 24a thereof. A more detailed description of the structure and operation of the MTMS 16a may be found in the aforesaid '609 Patent that is incorporated herein by reference.

Second Embodiment

As an alternative to the above discussed first embodiment of the invention, there may be provided a second embodiment thereof as shown in FIG. 5. An electronic tire tag 90 (FIG. 5) according the second embodiment of the invention includes numerous parts that correspond in all respects to those of the prior art electronic tire tag 10 of FIG. 1. Accordingly, in the following discussion, such corresponding parts in FIG. 5 each bear the same numerical designation as they do in FIGS. 1, followed by the letter "e."

The electronic tag 90 (FIG. 5) has an electrical ground (G), generally comprises a suitable transponder 12e, and optionally includes at least one conventional temperature or pressure condition sensor 14e that is suitably electrically connected to the transponder 12e. Assuming the provision thereof, the at least one condition sensor 14e provides an analog signal 15e corresponding to a condition sampled by the condition sensor 14e in response to energization thereof.

The electronic tag 90 (FIG. 5) preferably includes a maximum temperature memory switch (MTMS) 16e conventionally electrically connected to the transponder 12e. The MTMS 16e has a multi-layered, bimetallic temperature-sensing beam 18e. In addition, the MTMS 16e has a multi-layered, bimetallic resetting beam 20e that includes a polysilicon heating resistance layer 21e. Further, the MTMS 16e has a test lead 22e extending from the temperature sensing beam 18e, and has a test lead 23e extending from the resetting beam 20e. The test lead 23e is conventionally electrically connected to the transponder 12e and the test lead 22e is conventionally electrically connected to the ground G. The temperature sensing beam 18e has a normally open, unlatched, state or position 24e, relative to the resetting beam 20e, wherein the temperature sensing beam 18e is disposed in overlapping relationship with the resetting beam 20e. In the unlatched position 24e, the electrical impedance of the MTMS 16e, as measured between the leads 22e and 23e, is preset to a value, such as for example substantially five megohms. Moreover, the temperature sensing beam 18e has a deflected, state or position 26e, relative to the resetting beam 20e, wherein the resetting beam 20e is disposed in deflecting engagement with the temperature sensing beam 18e and the electrical impedance of the MTMS 16e, as measured between the leads, 22e and 23e, is preset to a value, such as for example substantially five hundred ohms. The MTMS 16e operates to close to the latched position 26e, when the MTMS 16e is exposed to a predetermined, extreme temperature. Thus, the voltage Vs across the MTMS 16e is normally at a high value, corresponding to an open circuit, until the MTMS 16e is exposed to the predetermined extreme temperature condition, whereupon, the voltage Vs falls to a low value, corresponding to a closed circuit. A more detailed description of the structure and operation of the MTMS 16e may be found in the aforesaid '609 Patent that is incorporated herein by reference.

Figure 7:
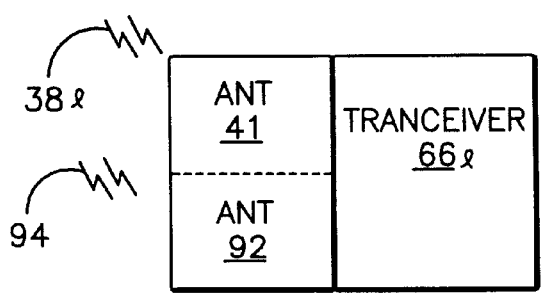
FIG. 7 is a schematic view of an external transceiver.

The transponder 12e (FIG. 5) includes an integrated circuit 30e that is typically a suitable complimentary, metal-oxide, semiconductor, and includes an antenna (ANT) 32e that is conventionally electrically connected to the integrated circuit 30e. Assuming the provision of the at least one condition sensor 14e, the integrated circuit 30e includes a conventional analog to digital (A/D) converter circuit 34e that may be a suitable relaxation oscillator circuitry. And, assuming the provision thereof the A/D converter circuit 34e is conventionally electrically connected to the condition sensor 14e for receiving therefrom the analog signal 15e and converting the analog signal 15e to a digital signal 36e representative of the condition sampled by the condition sensor 14e. The antenna 32e may but need not be suitably tuned to a predetermined radio frequency (RF) signal 38e within the range of from 115 to 135 kilohertz, and typically 125 kilohertz, for receiving RF signals 38e from an external transceiver 66e (FIG. 7) having an antenna 41e. The integrated circuit 30e (FIG. 5) also includes a read only memory (ROM) 42e that is typically an electrically erasable, programmable, read only memory (EEPROM) having stored therein a unique serial number (SN) 44e for identifying the electronic tire tag 90.

Moreover, the integrated circuit 30e (FIG. 5) includes an RF rectifier circuit (RF RECT) 46e that is suitably electrically connected to the antenna 32e for receiving the RF signal 38e therefrom, in response to the antenna 32e receiving the RF signal 38e from the external transceiver 66e. The RF rectifier circuit 46e rectifies the RF signal 38e to provide a direct current (D.C.) power signal (B+) 48e, for energizing the integrated circuit 12e and, if provided, the connected condition sensor 14e. The integrated circuit 30e is thus constructed and arranged for receiving a RF signal 38e and applying the received RF signal 38e to the RF rectifier circuit 46e for rectification thereby to provide the D.C. power signal 48e. Moreover, the integrated circuit 30e includes a logic circuit 50e having a transmitter circuit (XMTR) 52e and data generating structure 53e. The integrated circuit 30e includes a suitable clock signal generating (CLK SIG GEN) circuit 54e, such as a conventional rectifying or counting circuit. The clock signal generating circuit 54e is conventionally constructed and arranged to receive the RF signal 38e, derive therefrom or otherwise generate a high frequency digital clock signal 56e and apply the clock signal 56e to the logic circuit 50e for use thereby as a timing signal.

The logic circuit 50e (FIG. 5) is conventionally electrically connected to the RF rectifier circuit 46e for receiving the D.C. power signal 48e from the RF rectifier circuit 46e. The logic circuit 50e is also conventionally electrically connected between the antenna 32e and the read only memory 42e, and, assuming the provision of the A/D converter circuit 34e, between the antenna 32e and the A/D converter circuit 34e. In addition, the logic circuit 50e is constructed and arranged to respond to receiving the D.C. power signal 48e from the RF rectifier circuit 46e to energize the ROM circuit 42e and the MTMS 16e and, if provided, the at least one condition sensor 14e and the A/D converter circuit 34e. Moreover, the logic circuit 50e is constructed and arranged to copy the serial number 44e from the energized ROM circuit 42e to the logic circuit 50e. Still further, assuming the provision of the A/D converter circuit 34e, the logic circuit 50e is constructed and arranged to cause the energized A/D converter circuit 34e to convert the analog condition signal 15e to a digital condition signal 36e and provide the digital signal 36e to the logic circuit 50e. Still further, the logic circuit 50e is constructed and arranged to determine the unlatched or latched state, 24e or 26e, respectively, of the MTMS 16e and to cause the data generating structure 53e to generate data Ds corresponding thereto, when the logic circuit 50e is energized. Moreover, the logic circuit 50e is constructed and arranged to cause the transmitter circuit 52e to transmit to the external transceiver 66 the data corresponding to the serial number 44e, the digital condition signal 36e and the data Ds corresponding to the unlatched or latched state, 24e or 26e, respectively, of the MTMS 16e, when the logic circuit 50e is energized. In addition, assuming the provision of the at least one condition sensor 14e and the A/D converter circuit 34e, the logic circuit 50e is constructed and arranged to transmit data corresponding to the digital condition signal 36e when the logic circuit 50e is energized.

The electronic tag 90 (FIG. 5) additionally includes a conventional low radio frequency (LFR) antenna (ANT) 102 that is preferably constructed and arranged for receiving a predetermined LFR signal 94. The LFR antenna 102 is preferably tuned to a frequency f2 within one of the frequency bands allocated for industrial, scientific and medical (ISM) equipment, as set forth in the U.S. Code of Federal Regulations (CFR) Title 47 Telecommunications, Chapter I Federal Communication Commission (FCC), Part 18-Industrial, scientific, and medical equipment, Subpart C—Technical Standards, Section 18.301 Operating Frequencies. Thus, the LFR antenna 102 is a suitable coil (L1) that is conventionally tuned to receiving a frequency f2 within an ISM equipment frequency band, as by means of suitable capacitor "C1." Preferably, the capacitor C1 is conventionally electrically connected to the coil L1, and more particularly directly there across. Preferably the tuned frequency f2 is nominally 13.56 MHz, or, within the range of from 13.553 MHz to 13.567 MHz. However, without departing from the spirit and scope of the invention, the LFR antenna 102 may be tuned to a frequency f2 within the range of the frequencies of any other ISM equipment frequency band.

Figure 6:
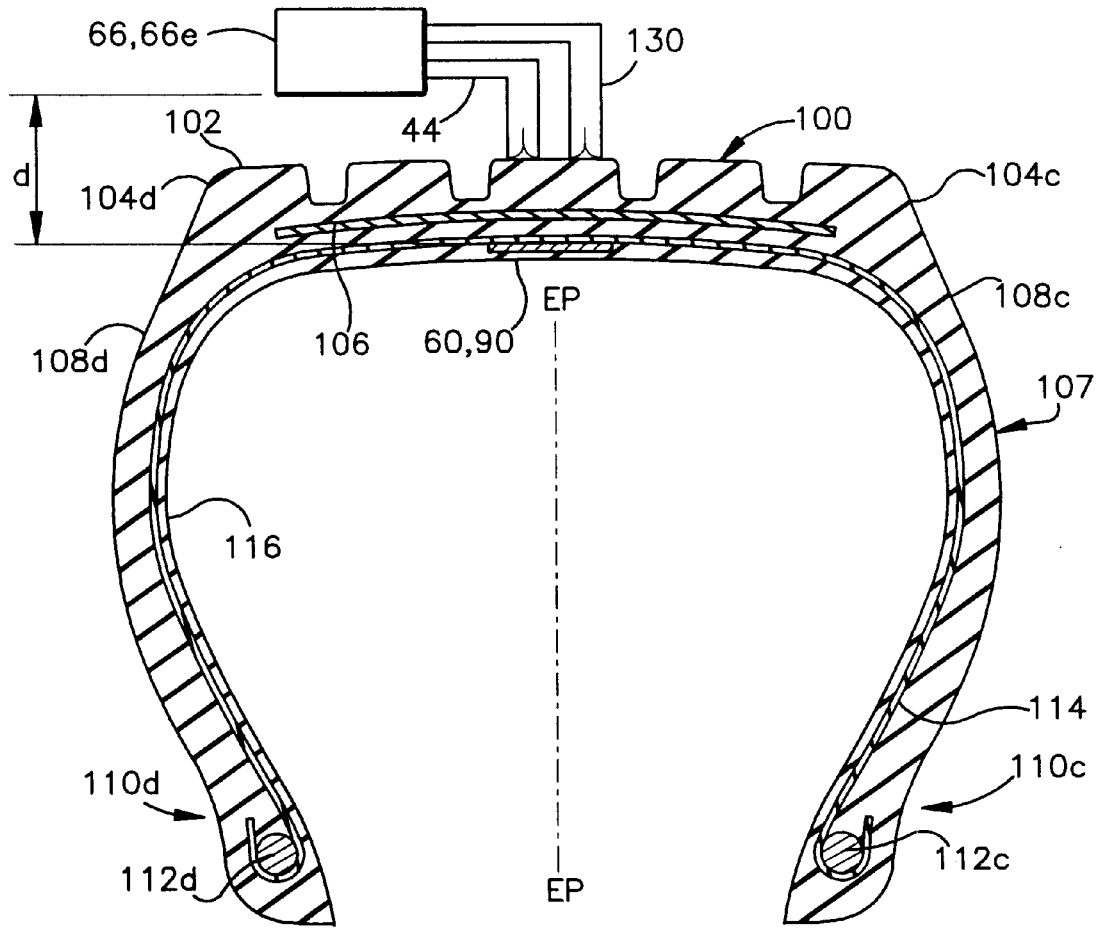
FIG. 6 is a schematic, transverse cross-sectional view of a pneumatic tire having a central tread and an innerliner, and showing an electronic tire tag embedded in the tire along the equatorial plane thereof, radially inwardly of the tread and radially outwardly in the innerliner.

According to the invention, when the electronic tag 60 or 90, as shown in FIGS. 3 and 5, respectively, is to be used in a tire, it is preferably conventionally encapsulated in a rigid or semi-rigid material, such as a urethane, epoxy or polystyrene resin, hard rubber compound or the like (not shown). Thereafter, the encapsulated electronic tag, 60 or 90, is preferably wrapped with a suitable green rubber material (not shown) and, either included with a green-rubber tire (not shown) or green rubber retread (not shown), for vulcanization therewith to form an integral part of a typical, cured, pneumatic tire 100 (FIG. 6).

A typical pneumatic tire 100 (FIG. 6), within which an electronic tire tag, 60 or 90 (FIG. 3 or 5), according to the invention is fixedly secured in the course of manufacture or re-treading thereof, comprises a tread 102, one or more radially extending belts 106 and a carcass 107. The carcass 107 has sidewalls 108c and 108d, oppositely spaced bead portions, 110c and 110d, including annularly shaped beads 112c and 112d, respectively. Moreover, the carcass 107 includes a ply 114 that extends between and is looped about each of the opposite beads 112c and 112d. Preferably, the electronic tag 60 or 90 (FIG. 3 or 5), according to the invention, is embedded in the tire 100 along the equatorial plane thereof, radially inwardly of the tread 102 and radially outwardly of the inner surface 116. However, without departing from the scope of the invention, the electronic tire tag, 60 or 90, may be otherwise secured to the tire 100.

According to the invention there is provided a transceiver 66, 66e (FIGS. 4 and 6) that includes an RF antenna 41d, 41e for communicating with an electronic tag 60 or 90, as the case may be, and also includes an LFR antenna 130 or 102, respectively, for transmitting a RF signal, 70 or 94, as the case may be. Moreover, although the following remarks are concerned with the preferred transmitting location of the transceiver antenna 130 relative to the tire 100, such remarks apply with equal force to the utilization of the transceiver antenna, 41a or 41e, in combination with a transmitter antenna, 130 or 102, respectively, for achieving the same result.

Assuming the provision of the transceiver 66 (FIG. 4), the LFR antenna 130 thereof is tuned to a predetermined frequency, f1 or f2, that is preferably within a predetermined ISM equipment frequency band. Moreover, the predetermined ISM equipment frequency band is preferably within the range of 13.553 to 13.567 megahertz. Preferably, the predetermined ISM equipment frequency, f1 or f2, is nominally 13.56 megahertz. In addition, the antenna 130 is preferably located in sufficiently close proximity to the LFR antenna, 68 of the electronic tire tag 60, to effectuate electromagnetic coupling between the transceiver antenna 130 and LFR antenna 68, 92 upon energization of the LFR antenna 130. According to the invention, in order to ensure electromagnetic coupling between the transceiver antenna 130 and the LFR antenna 68 upon energization of the transceiver 66, the transceiver antenna 130 is preferably located at a predetermined location relative to the LFR antenna 68 set in the course of manufacture of the tire 110 (FIG. 6). Moreover, to ensure such electromagnetic coupling, the transceiver antenna 130 is preferably located in close proximity to the electronic tire tag 60 or 90, for example, within a distance "d" of substantially one to two inches and not more than substantially two inches from the electronic tire tag 60. Still further, according to the invention, the transceiver 66 preferably transmits the RF signal 70 for a predetermined time interval that is within the range of from substantially 150 to 300 milliseconds and is preferably substantially 250 milliseconds. In any event, according to the invention, the transceiver 66 is preferably operated for a sufficient time interval to permit the D.C. signal 48a to cause the flow of or induce a current in the resistance layer 24a or 21e for dissipation thereby of a predetermined wattage. Preferably the predetermined wattage is within the range of from substantially 40 to 100 milliwatts. Still further, according to the invention, the transceiver 66 is preferably constructed and arranged for transmitting the RF signal 70 or 94 at a predetermined power level of from substantially three and one-half to four and one-half watts, and, preferably, substantially 4 watts.

Although the preferred embodiments of the invention have hereinabove been shown and described in detail, such embodiments should be considered to illustrative and not restrictive in character. In this connection it is noted that numerous variations of the preferred embodiments of the invention may become apparent to persons skilled in the art as a result of having seen the foregoing drawings and read and understood the accompanying description appertaining to the invention, and it is intended that such variations as fall within the scope the invention shall be protected to the same extent as are the preferred embodiments of the invention.

What is claimed is:

1. A method of resetting a micro-mechanical temperature memory switch (MTMS) having an unlatched state and latched state in an electronic tag with a transponder having a logic circuit and first apparatus for providing a first direct current (D.C.) signal, the method having the steps of:

providing a second D.C. signal with a second apparatus;

receiving the first and second D.C. signals with an electronic switching circuit; and normally applying the first D.C. signal to the logic circuit and diverting the first D.C. signal to the MTMS for resetting the MTMS in response to receiving the second D.C. signal with an electronic switching circuit.

2. The method according to claim 1 including the step receiving the second D.C. signal with an electronic switching circuit to divert the first D.C. signal from energization of the logic circuit to energize the MTMS for causing the MTMS to reset from the latched state thereof to the unlatched state thereof.

3. The method according to claim 1, including the steps of providing the first D.C. signal apparatus with a first radio frequency (RF) antenna for receiving a first RF signal;

providing the transponder with a first RF rectifier circuit electrically connected to the first RF antenna for receiving the first RF signal therefrom; and rectifying the first RF signal for providing the first D.C. signal.

4. The method according to claim 1, including the steps of providing the second D.C. signal providing apparatus with a second radio frequency (RF) antenna for receiving a second RF signal; and providing the second D.C. signal providing apparatus with a second RF rectifier circuit electrically connected to the second RF antenna for receiving therefrom and rectifying the second RF signal for providing the second D.C. signal.

5. The method according to claim 4, wherein the step of providing the second RF antenna includes the step of tuning the second RF antenna to a predetermined frequency.

6. The method according to claim 4, wherein the step of providing the second RF antenna includes the step of tuning the second RF antenna to a frequency within the range of from 13.553 to 13.567 megahertz.

7. The method of claim 1 wherein the tag is disposed within a tire and the MTMS is reset to the unlatched state subsequent to the tire reaching a predetermined temperature causing the MTMS to go into the latched state.

8. An electronic tag including a transponder and a micro-mechanical temperature memory switch (MTMS) having an unlatched state and a latched state, wherein the transponder includes a logic circuit, the electronic tag including first apparatus for providing a first direct current (D.C.) signal, the electronic tag characterized by:

second apparatus for providing a second D.C. signal;

an electronic switching circuit for receiving the first and second D.C. signals; and the electronic switching circuit connected for normally applying the first D.C signal to the logic circuit and for diverting the first D.C. signal therefrom to the MTMS for resetting the MTMS in response to receiving the second D.C. signal.

9. The electronic tag according to claim 8 including the electronic switching circuit operable in response to receiving the second D.C. signal to divert the first D.C. signal from energization of the logic circuit to energization of the MTMS for causing the MTMS to reset from the latched state thereof to the unlatched state thereof.

10. The electronic tag according to claim 8, wherein the first D.C. signal providing apparatus includes a first radio frequency (RF) antenna for providing a first RF signal, the transponder including a first RF rectifier circuit electrically connected to the first RF antenna for receiving therefrom and rectifying the first RF signal for providing the first D.C. signal.

11. The electronic tag according to claim 8 wherein the second D.C. signal providing apparatus includes a second radio frequency (RF) antenna for providing a second RF signal, the transponder including a second RF rectifier circuit electrically connected to the second RF antenna for receiving therefrom and rectifying the second RF signal for providing the second D.C. signal.

12. The electronic tag according to claim 8, wherein the second D.C. signal providing apparatus includes a second radio frequency (RF) antenna tuned to a predetermined radio frequency.

13. The electronic tag according to claim 12, wherein the predetermined frequency is in an ISM equipment frequency band.

14. The electronic tag according to claim 12, wherein the predetermined frequency is within the range of from 13.553 to 13.567 megahertz.

15. The electronic tag according to claim 12, wherein the second D.C. signal providing apparatus includes a second RF rectifier circuit electrically connected to the second RF antenna for receiving the second RF signal and providing the second D.C. signal.

16. The electronic tag according to claim 15, wherein the predetermined frequency is within the range of from 13.553 to 13.567 megahertz.

* * * * *